Sept. 24, 1957 J. J. KIMBRO 2,807,049
SAFETY MECHANISM FOR MOLDING APPARATUS
Filed Oct. 11, 1954 2 Sheets-Sheet 1

INVENTOR.
John J. Kimbro
BY
ATTORNEY.

Sept. 24, 1957 J. J. KIMBRO 2,807,049
SAFETY MECHANISM FOR MOLDING APPARATUS
Filed Oct. 11, 1954 2 Sheets-Sheet 2
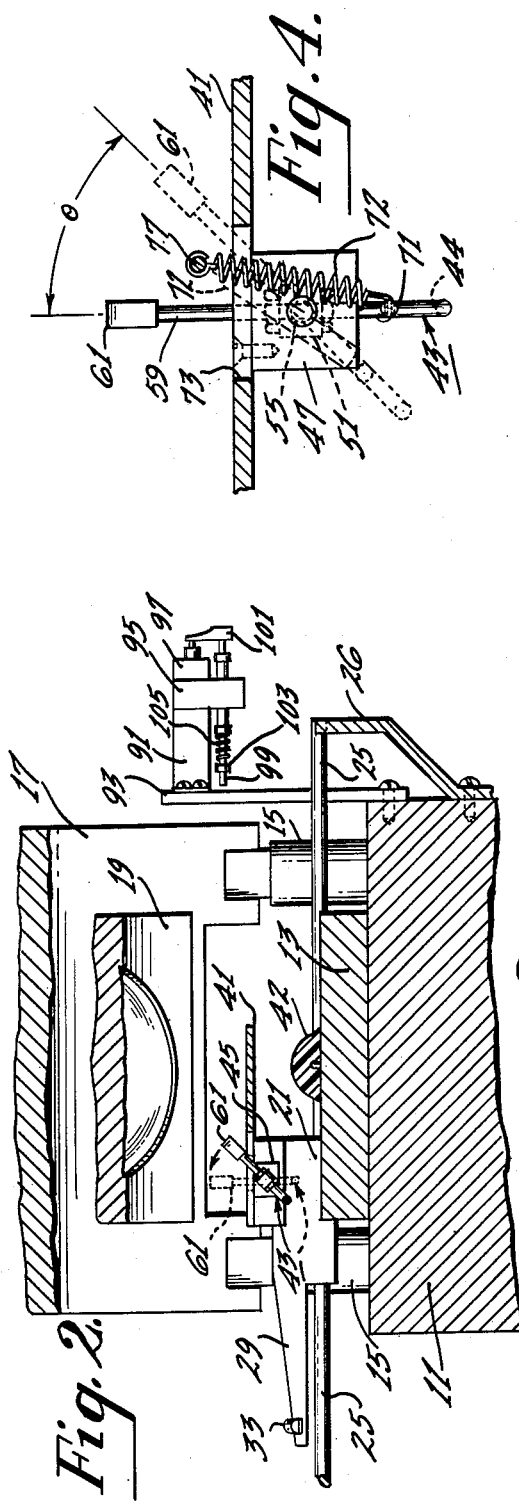
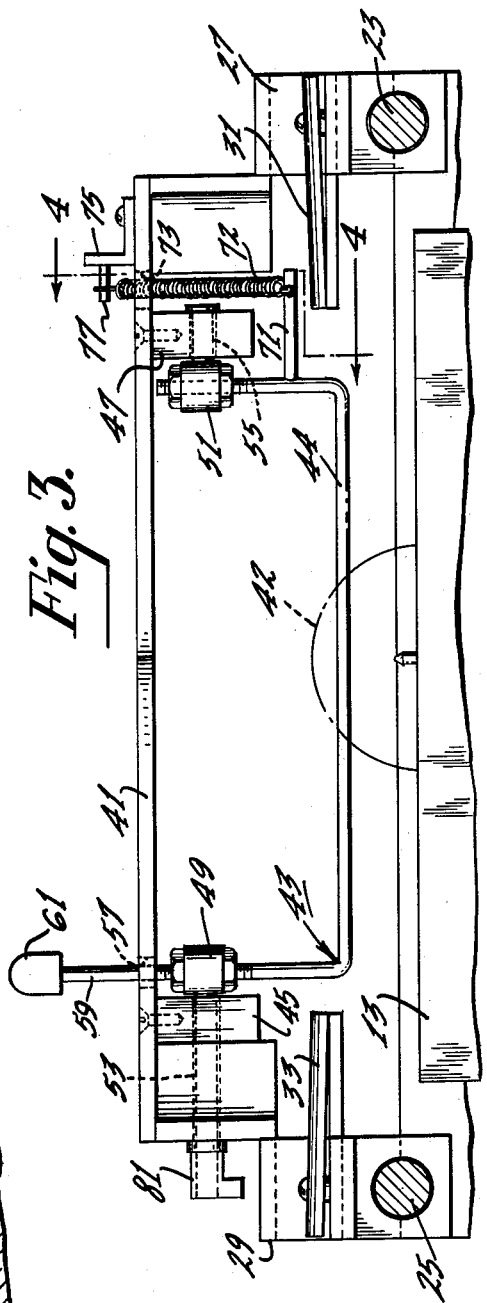
INVENTOR.
John J. Kimbro
BY
ATTORNEY.

United States Patent Office 2,807,049
Patented Sept. 24, 1957

2,807,049

SAFETY MECHANISM FOR MOLDING APPARATUS

John J. Kimbro, Indianapolis, Ind., assignor to Radio Corporation of America, a corporation of Delaware Application October 11, 1954, Serial No. 461,344

5 Claims. (Cl. 18—16)

This invention relates to a safety mechanism for an automatic molding apparatus, and, more particularly, to a mechanism for automatically stopping the operation of a molding press when a charge of moldable material is not deposited in the mold.

In the operation of automatic molding apparatus, such as an automatic record press, it is very desirable to provide means for stopping the operation of such apparatus when some lapse in the operating cycle occurs. This is desirable because in most instances such apparatus includes molding parts which are expensive and which are easily damaged if the apparatus does not function properly. This is especially desirable in the case of an automatic record press because the stampers, from which the records are pressed, are very expensive and are invariably ruined if the press closes when there is no charge of moldable material between the molding stampers. It is further desirable to provide these safety measures from the standpoint of time lost in the replacement of parts which might be damaged due to a faulty operation of the apparatus.

The present invention relates to a mechanism which is especially adapted for use with a swing leaf type of molding press wherein a lower molding platen, for example, is fixed and lies in a substantially horizontal position and wherein an upper molding platen, for example, is pivotally mounted to swing downwardly into engagement with the lower platen. If the automatic means for depositing a charge of moldable material, such as a plastic gob for example, failed to function, the molding platens would continue to close and open cyclically, and the other elements of the apparatus would continue to function needlessly thus permitting under wear and tear on the operating mechanism while nothing is being produced from the apparatus.

An object of this invention, therefore, is to provide a novel mechanism for detecting the presence of a charge of moldable material between the molding platens prior to the closing thereof.

Another object of this invention is to provide a novel mechanism which will respond to the absence of a moldable charge to shut off an automatic molding apparatus.

A further object of this invention is to provide a novel mechanism which will respond to the presence of a moldable charge to cause the shut off means to be inoperative.

A still further object of this invention is to provide an automatic shut off mechanism, to respond to the presence or absence of a charge of moldable material, which is simple in structure and efficient in operation.

In apparatus embodying the present invention a safety mechanism makes use of a carriage which moves across a lower molding platen when the platens are in the open position. Such a carriage might already be a part of the apparatus, such as a mechanism for removing a molded article from the platens. This carriage would be located on one side of the platens during the molding operation. When the platens are opened, the carriage might move across the lower platen carrying the molded article to a station remote from the platens. At this point, the new charge of moldable material would be deposited on the horizontal platen. When the carriage reaches its last named position, an arm pivotally mounted on the carriage is pivoted to a position where it will actuate a switch upon the return of the carriage to its first named position. When the carriage now returns to its first named position, if there is no charge of moldable material upon the lower platen, the arm will remain in the above-described position and the switch will be actuated to shut off the apparatus. However, if a charge of moldable material is present, the arm will be pivoted or shifted so that it will not engage the switch.

The novel features of the invention, as well as additional objects and advantages thereof, will be understood more fully from the following description when read in connection with the accompanying drawings, in which:

Figure 2 is a front elevational view, in section, of a portion of the apparatus of Figure 1 indicating alternative positions of the safety arm;

Figure 3 is an elevational view from the lefthand side of Figure 2 showing the safety arm in position for actuating the switch; and Figure 4 is a sectional view taken on line 4—4 of Figure 3, as viewed in the direction of the arrows, to show the biasing means for the safety arm.

Figure 1:
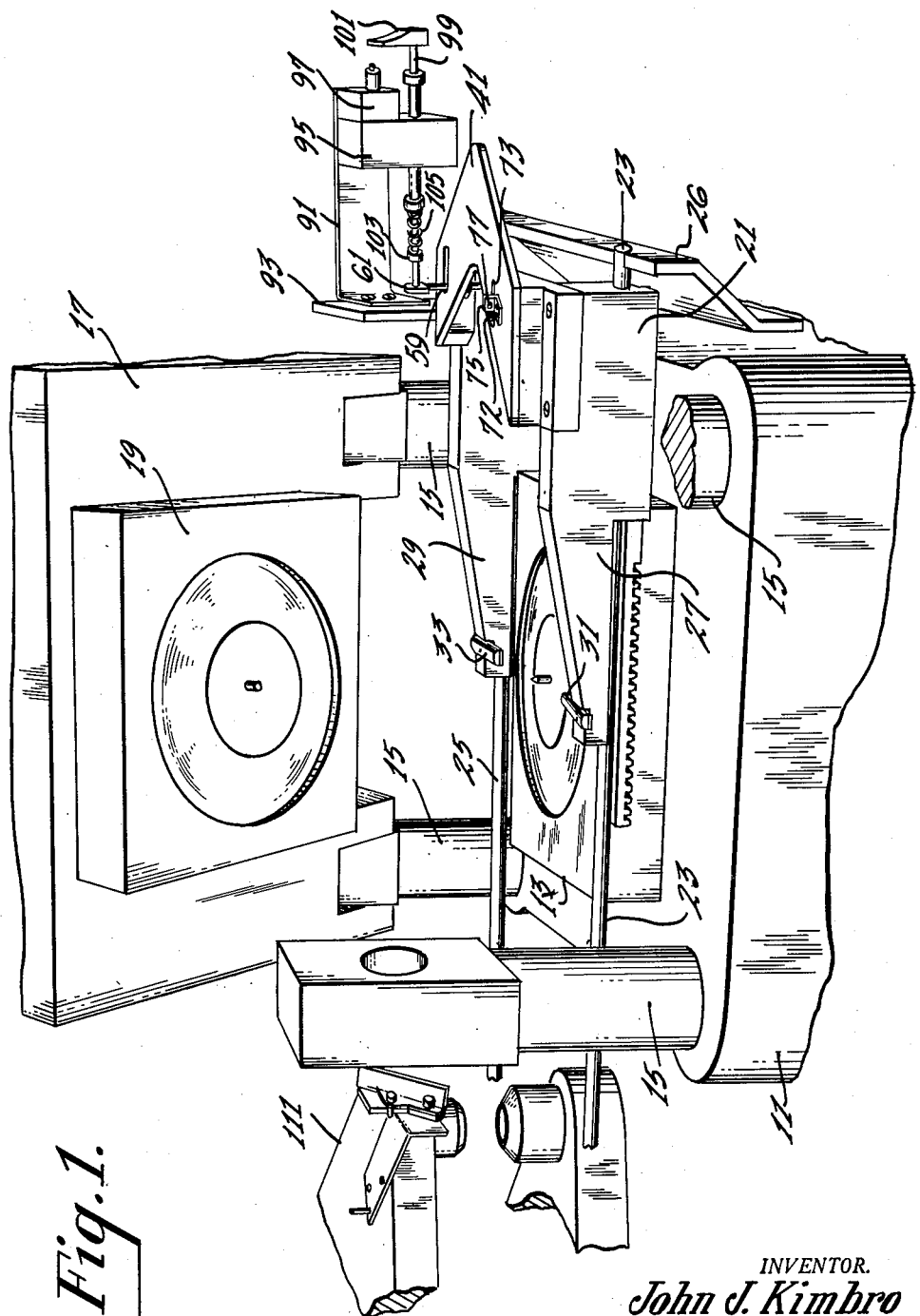
Figure 1 is a perspective view of a portion of a molding apparatus embodying the invention and including a carriage and a safety arm which is in the switch engaging position.

Referring in more detail to the accompanying drawings, a mechanism according to the present invention is illustrated in conjunction with an automatic record molding press. This press comprises a bed 11 which supports the lower molding platen 13 and the supporting posts 15 for the swing leaf 17. An upper molding platen 19 is carried by the swing leaf 17. A carriage 21 is mounted on a pair of tubular tracks 23 and 25 and is movable horizontally across the lower platen 13. These tracks 23 and 25 are supported by suitable brackets 26 on the press bed 11.

Referring to Figure 1, the carriage 21 is located at its extreme right end position. In this position the carriage is so disposed that the swing leaf 17 may be permitted to close the upper platen 19 upon the lower platen 13. The carriage has a pair of arms 27 and 29 which support, respectively, fingers 31 and 33 for gripping the molded record at the completion of the molding cycle.

The carriage 21 includes a plate 41 which extends across the lower molding platen in a plane substantially parallel to the surface thereof and adjacent thereto. A safety arm 43, having substantially a U shape, is supported by the plate 41. A pair of bearings 45 and 47 are mounted underneath the plate 41 toward either side thereof and are aligned in a direction perpendicular to the direction of movement of the carriage 21. A pair of collars 49 and 51 are secured to the upright portions of the safety arm and these collars are provided, respectively, with journals 53 and 55 which extend laterally in the plane of the U-shaped safety arm. The journals 53 and 55 are seated, respectively, in the bearings 45 and 47. The safety arm 43 will assume two stable positions. One is an upright position in which the plane of the arm is substantially perpendicular to the surface of the lower platen 13. In the alternative position, the arm is pivoted or shifted a fixed amount θ away from this upright position. The transverse portion 44 of the U safety arm is disposed adjacent the surface of the lower platen 13 when the arm is in its upright position and is mounted so that it will swing out of the way should it encounter an object, such as a gob of plastic material 42, on the surface of the platen 13 as it is moved across the platen.

The plate 41 is provided with an aperture 57 to permit an upper extension 59 of the U arm to extend therethrough. This extension 59 carries a contact member 61 which is provided to engage a switching mechanism to be described subsequently.

Referring to Figure 3, the safety arm 43 is illustrated in its upright position. Referring to Figure 4, the safety arm is shown, in full, in its upright position and, in dotted lines, in its tilted position. In order for the mechanism to operate effectively, the safety arm must be stable in each of these two positions. In order to accomplish this, an extension 71 is provided which extends in a direction parallel to the pivotal axis of the safety arm and is spaced therefrom. A means is provided at the end of this extension 71 for the attachment of one end of a tension spring 72 thereto. An aperture 73 is provided in the plate 41 so that the spring 72 may extend therethrough. A bracket 75 is rigidly mounted on the plate 41 adjacent the aperture 73 and carries a finger 77 to which the other end of the spring is attached.

Referring again to Figure 4, it will be noted that when the safety arm 43 is in the upright position, the journal 55 and the arm extension 71 are aligned in a vertical direction. When the safety arm 43 is in the shifted position, the journal 55 and the arm extension 71 are aligned at a predetermined angle θ away from the vertical direction. In order that the spring may bias the safety arm 43 to both of these positions, the line defined by the journal 55 and the finger 77, to which the spring is attached, should lie somewhere between the previously defined lines of alignment and should preferably lie at the intermediate point. With this arrangement, if the safety arm 43 is urged from one position, it will resist the urging force until the arm passes the intermediate line of alignment at which time the spring 72 will draw the arm 43 toward the other position.

The journal 53 extends through the bearing 45 and protrudes from the side of the carriage. A finger 81 is rigidly attached to the end of this extension and will perform a function to be described subsequently.

A switching mechanism, which is adapted to be actuated by the above described safety arm mechanism, may be described as follows: A bracket 91 is mounted on a supporting element 93 which is fixed in relation to the press bed 11. The bracket 91 extends in the direction of movement of the carriage 21 and carries a block 95 at its free end. A button switch 97 is mounted on the block 95 and may operate in such a manner that when the switch button is depressed a solenoid air valve is held open, this valve permitting the swing leaf 17 to be opened and closed in accordance with a predetermined cycle. For the purpose of this description then, when the switch button is depressed, the press is permitted to function normally.

The block 95 also supports a switch operating rod 99 which is aligned in the direction of movement of the carriage 21 and mounted for reciprocating movement in this direction. A laterally extending finger 101 is fixed to the end of the rod 99 which extends from the block 95 on the same side thereof as the switch 97. This finger 101 is adapted to engage the button of the switch 97. A collar 103 is provided adjacent the end of the rod 99 extending from the other side of the block 95. A compression spring 105 is slipped over the rod 99 and is retained between the block 95 and the collar 103. By these means then, the rod 99 is continually urged or biased toward the left, in Figures 1 and 2, and normally maintains the finger 101 against the button switch 97 to maintain the switch closed.

In the following description of the operation of the above described mechanism, it will be assumed that the starting position for the carriage 21 is the position illustrated in Figure 1. However, the safety arm 43 will be in the tilted position rather than the upright position illustrated in Figure 1. When the swing leaf 17 is raised at the conclusion of a molding cycle, the fingers 31 and 33 will grip the molded article and the carriage 21 will be caused to move toward the left. When the carriage reaches a position remote from the starting position, such as a punching station 111, the finger 81 will be moved into engagement with a cam or a similar member (not shown) which will cause the safety arm 43 to be flipped to its upright position. During this time a gob of moldable material will be deposited on the lower platen 13 in preparation for the next molding cycle. When the carriage 21 now returns across the lower platen 13 to its starting position, the transverse portion 44 of the safety arm 43 will strike the gob of moldable material and the arm will be caused to flip back to its tilted position. The carriage will then return to its starting position. The platens will again close to perform the molding operation and then complete operation of the cycle will be repeated.

If a gob of moldable material is not deposited on the lower platen at the appropriate time, the safety arm 43 which has been flipped to its upright position by the finger 81 will not be flipped to the tilted position as above described. With the safety arm now remaining in this upright position, as the carriage approaches its starting position, the contact member 61 of the safety arm will engage the end of the rod 99 of the switching mechanism. Continued lateral movement of the carriage and arm will then force the rod 99 toward the right against the biasing force of the spring 105. This will move the finger 101 out of engagement with the switch 97 permitting the switch to open. As previously suggested, the switch may cause the closing of a solenoid valve to stop further operation of the press so that the cause of the defective operation might be cured.

What is claimed is:

1. A mechanism for use with automatic molding apparatus to shut down said apparatus in response to the failure of said apparatus to deposit a charge of moldable material on a mold thereof, said mechanism comprising a member movable to traverse said mold, a control switch for said apparatus disposed adjacent the path of movement of said member, a single means carried by said member for sensing a charge and for operating said control switch, said sensing and operating means being movable from a first stable position to a second stable position, said movement of said sensing and operating means occurring upon engagement of said means with a charge of deposited material on said mold, said sensing and operating means in said second stable position thereof being positioned for nonengagement with said control switch, and means positioned at the end of the path of movement of said member remote from said switch for causing said sensing and operating means to be returned to said first stable position.

2. A mechanism for use with automatic molding apparatus to shut down said apparatus in response to the failure of said apparatus to deposit a charge of moldable material on a mold thereof, said mechanism comprising a control switch for said apparatus, actuating means for said switch, a carriage mounted for movement across the surface of said mold, and an arm pivoted upon said carriage, said arm being normally positioned to encounter and operate said switch actuating means, said arm being movable from said normal position by presence of a charge of material deposited on said mold.

3. In automatic molding apparatus wherein a charge of moldable material is deposited on a substantially horizontal molding platen, a mechanism for automatically shutting down said apparatus in response to the absence of a charge of material on said platen, said mechanism comprising a reciprocating carriage movable across said molding platen and adjacent thereto, a shutoff switch for said apparatus, actuating means for said shutoff switch, and means pivotally mounted on said carriage, said pivotally mounted means having a first and second stable position, said deposited moldable material being disposed in the path of said pivotally mounted means in a first position thereof, said switch actuating means being disposed in the path of said pivotally mounted means in said first position, said pivotally mounted means being disposed to clear said switch actuating means in said second position thereof, the presence of said deposited moldable material serving to move said pivotally mounted means to said second position.

4. In automatic molding apparatus having a pair of molding platens wherein a charge of moldable material is deposited on a substantially horizontal molding platen, a mechanism for automatically shutting down the operation of said platens in response to the failure of said apparatus to cause said charge to be deposited on said horizontal platen, said mechanism comprising a switch for controlling said apparatus, means for maintaining said switch in circuit closing condition, a carriage mounted for reciprocating movement across the face of said horizontal molding platen, a safety arm pivotally mounted on said carriage and extending upwardly and downwardly therefrom, the downward extension of said arm being disposed to encounter said charge of material and the upward extension of said arm being disposed to encounter said switch condition maintaining means when said carriage moves across said platen, and means permitting said safety arm to pivot upon engagement with said charge of moldable material whereby said upper arm extension occupies a position to be free of said switch condition maintaining means.

5. In automatic molding apparatus having a substantially horizontal molding platen and means for depositing a charge of moldable material thereon, a mechanism for automatically stopping the operation of said apparatus in response to the failure of said charge depositing means to deposit a charge on said platen, said mechanism comprising a control switch for said apparatus, a spring biased switch operating rod for maintaining said switch in circuit closing condition, a carriage mounted for reciprocating movement adjacent to and across the face of said molding platen, a safety arm pivotally mounted on said carriage to swing in the direction of motion of said carriage, said safety arm having a lower extension disposed to encounter said charge of moldable material, said safety arm having an upper extension disposed to encounter said switch operating rod, means for biasing said safety arm to alternative stable positions, said arm being disposed to encounter said charge and said switch operating rod in one position, and means permitting said safety arm to shift to said other position upon engagement with said charge of moldable material whereby said upper extension is free of said switch operating rod.

References Cited in the file of this patent

UNITED STATES PATENTS

| | | |
|---|---|---|
| 2,373,582 | Kuchl | Apr. 10, 1945 |
| 2,444,339 | Dinzl | June 29, 1948 |

FOREIGN PATENTS

| | | |
|---|---|---|
| 149,609 | Australia | Nov. 22, 1951 |